(12) United States Patent  (10) Patent No.: US 7,835,481 B2
di Bari et al.  (45) Date of Patent: Nov. 16, 2010

(54) INSTRUMENT REMOVAL SYSTEM

(75) Inventors: Nicholas Francesco di Bari, Fremont, CA (US); Drew R. Holifield, Flint, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/313,904

(22) Filed: Dec. 21, 2005

(65) Prior Publication Data

US 2007/0140404 A1 Jun. 21, 2007

(51) Int. Cl.
 *G21C 19/00* (2006.01)
(52) U.S. Cl. .................. 376/260; 376/245; 376/272; 254/264; 254/405
(58) Field of Classification Search .......... 376/260, 376/245, 361, 294, 292, 305, 249, 271, 268, 376/272; 176/19 R, 19 J, 36 W, 30, 19 LD; 29/759, 428, 706, 714; 219/60, 125.11, 137.62; 252/633, 626, 628; 242/25 R, 78, 81, 115, 242/18 R, 41, 110, 116; 254/264, 405
See application file for complete search history.

(56) References Cited

U.S. PATENT DOCUMENTS

| 3,136,436 | A | * | 6/1964 | Erlinder et al. | 414/409 |
| 3,598,996 | A | * | 8/1971 | Haebler et al. | 376/254 |
| 3,751,333 | A | * | 8/1973 | Drummond et al. | 376/255 |
| 4,100,860 | A | * | 7/1978 | Gablin et al. | 109/83 |
| 4,313,793 | A | * | 2/1982 | Klumb et al. | 376/260 |
| 4,646,985 | A | * | 3/1987 | Goyau et al. | 242/386 |
| 4,714,209 | A | * | 12/1987 | Allard | 242/473.9 |
| 4,720,369 | A | * | 1/1988 | Cadaureille et al. | 376/248 |
| 4,927,090 | A | * | 5/1990 | Matsumoto | 242/533.7 |
| 5,225,114 | A | * | 7/1993 | Anderson et al. | 588/16 |
| 5,383,714 | A | * | 1/1995 | Hunter | 298/17 R |
| 5,388,781 | A | * | 2/1995 | Sauber | 242/388.6 |
| 5,595,355 | A | * | 1/1997 | Haines | 242/470 |
| 5,621,776 | A | * | 4/1997 | Gaubatz | 376/242 |
| 5,787,137 | A | * | 7/1998 | Nelson et al. | 376/249 |
| 5,802,127 | A | * | 9/1998 | Goldberg | 376/262 |
| 5,838,751 | A | * | 11/1998 | Thompson et al. | 376/260 |
| 5,988,555 | A | * | 11/1999 | Unruh et al. | 242/470 |
| 6,758,279 | B2 | * | 7/2004 | Moore et al. | 166/381 |
| 7,145,976 | B2 | * | 12/2006 | Latreille et al. | 376/260 |

OTHER PUBLICATIONS

Rahn et al, A Guide to Nuclear Power Technology, J. Willey & Son, NY, 1984.*

* cited by examiner

*Primary Examiner*—Rick Palabrica
(74) *Attorney, Agent, or Firm*—Armstrong Teasdale LLP

(57) ABSTRACT

An instrument removal system for removing detector cables from a nuclear reactor includes a removal cart and a disposal cask. in an exemplary embodiment, the removal cart includes a base including a plurality of wheels coupled thereto, a motor mounted on the base, and a drive shaft operatively coupled to the motor. A disposal spool is removably mounted on the drive shaft, and the disposal spool includes a notch sized to receive the detector cable. A housing is mounted on the base, with the housing enclosing the disposal spool. Also, an entrance port is located in the housing to permit the detector cable to enter the housing.

12 Claims, 6 Drawing Sheets

INSTRUMENT REMOVAL SYSTEM

BACKGROUND OF THE INVENTION

This invention relates generally to nuclear reactors, and more particularly, to an instrument removal system to remove detector cables from their housing.

A reactor pressure vessel (RPV) of a boiling water reactor (BWR) typically has a generally cylindrical shape and is closed at both ends, e.g., by a bottom head and a removable top head. A core assembly is contained within the RPV and includes the core support plate, fuel assemblies, control rod blades and a top guide. A core shroud typically surrounds the core assembly and is supported by a shroud support structure. Particularly, the shroud has a generally cylindrical shape and surrounds both the core plate and the top guide. There is a space or annulus located between the cylindrical reactor pressure vessel and the cylindrically shaped shroud.

A plurality of detectors are utilized to monitor the reactor. Periodically detectors need to be removed for replacement. The detectors are typically positioned in a housing and are attached to cables for transmitting data. A known method of removing detectors includes the use of a bottom entry disposal system which utilizes a pinch wheel system to pull the detector cables from the housing. The detector cables are fed into a cutter for cutting into small two inch pieces for disposal. The detector cable pieces are fed into a disposal cask for transport and removal from the reactor. However, this method has some shortcomings, for example, pinch wheels can slip causing jammed detector cables and/or missed cuts. Also, cutters can jam and generate loose, irradiated chips. Further, disposal casks can fill unevenly which can make cask lids difficult to close.

BRIEF DESCRIPTION OF THE INVENTION

In one embodiment, an instrument removal system for removing detector cables from a nuclear reactor is provided. The instrument removal system includes a removal cart and a disposal cask. The removal cart includes a base including a plurality of wheels coupled thereto, a motor mounted on the base, and a drive shaft operatively coupled to the motor. A disposal spool is removably mounted on the drive shaft, and the disposal spool includes a notch sized to receive the detector cable. A housing is mounted on the base, with the housing enclosing the disposal spool. Also, an entrance port is located in the housing to permit the detector cable to enter the housing.

In another aspect, a method of removing detectors from a nuclear reactor using an instrument removal system is provided. the instrument removal system includes a removal cart and a disposal cask. The removal cart includes a base, a plurality of wheels coupled to the base, a motor mounted on the base, a drive shaft operatively coupled to the motor, a disposal spool removably mounted on the drive shaft, a notch in the disposal spool sized to receive the detector cable, a housing mounted on the base that encloses the disposal spool, an entrance port in the housing sized to permit the detector cable to enter the housing. The reactor includes a pressure vessel, an under vessel platform, and a plurality of transfer rails. The method includes positioning the removal cart under the reactor pressure vessel, attaching the detector cable to the disposal spool, winding the detector cable onto the disposal spool, transferring the disposal spool to the disposal cask, and moving the disposal cask from under the reactor pressure vessel.

In another aspect, a nuclear reactor is provided. The nuclear reactor includes a reactor pressure vessel, an under vessel platform positioned below the reactor pressure vessel, a plurality of transfer rails positioned below the reactor pressure vessel, at least one detector cable coupled to the reactor pressure vessel, and an instrument removal system operationally positioned on the transfer rails below the reactor pressure vessel. The instrument removal system includes a removal cart and a disposal cask. The removal cart includes a base including a plurality of wheels coupled thereto, a motor mounted on the base, and a drive shaft operatively coupled to the motor. A disposal spool is removably mounted on the drive shaft, and the disposal spool includes a notch sized to receive the detector cable. A housing is mounted on the base, with the housing enclosing the disposal spool. Also, an entrance port is located in the housing to permit the detector cable to enter the housing.

DETAILED DESCRIPTION OF THE INVENTION

An instrument removal system and method of removing detectors from a nuclear reactor is described in detail below. The system includes a removal cart that includes a disposal spool operatively coupled to a motor. A detector cable is coiled around the spool by rotating the spool with the motor, and then the disposal spool is transferred to a disposal cask for removal from the reactor. The removal system does not have a cable cutting process which eliminates loose chips and/or jammed cutters that need be cleared by personnel. The removal system utilizes existing under vessel equipment, for example, under vessel platform and rails, has low complexity with minimal operator interface resulting in lower personnel exposure to radiation.

Figure 1:
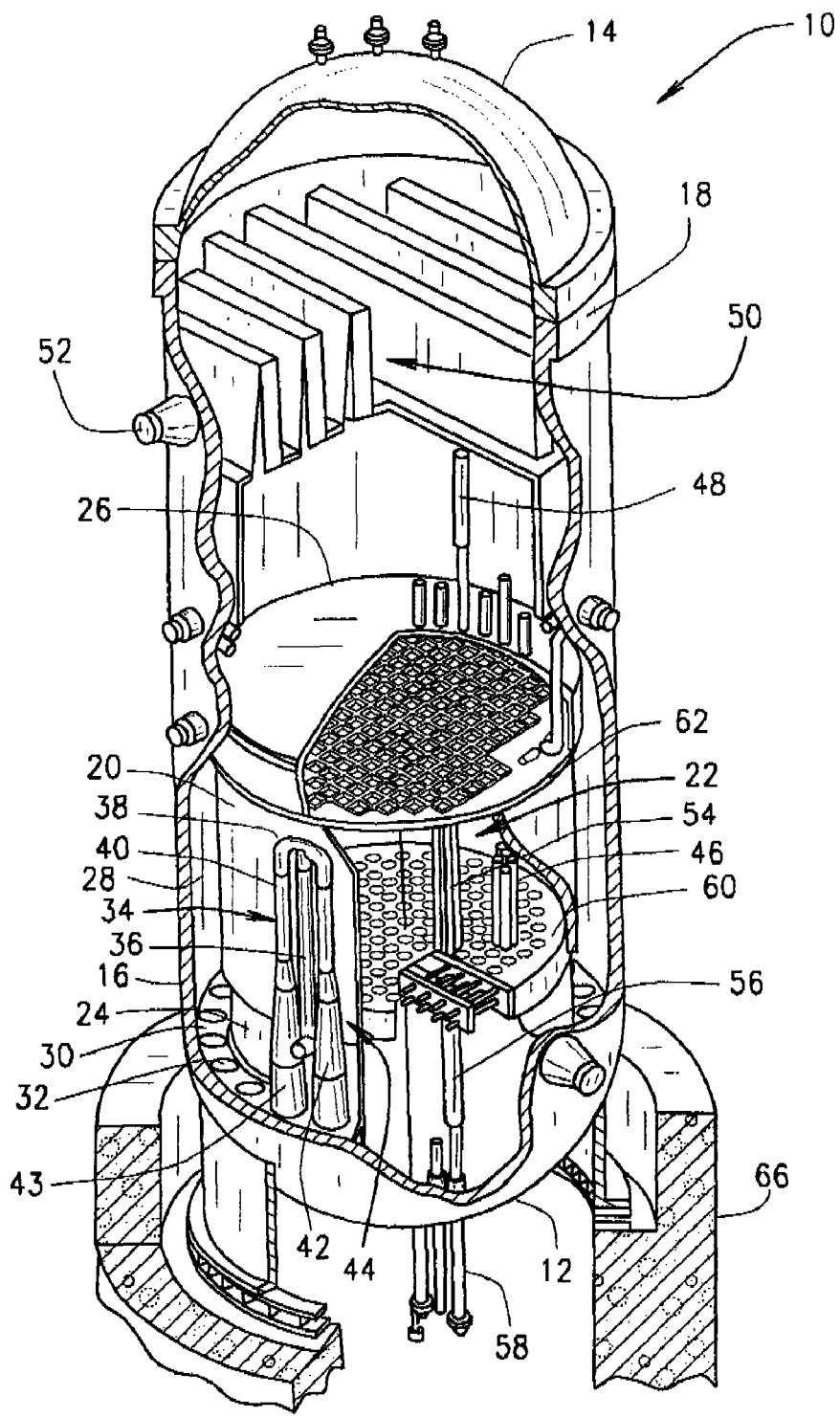
FIG. 1 is a sectional schematic illustration, with parts cut away, of a boiling water nuclear reactor.

Referring to the drawings, FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side-wall 16 extends from bottom head 12 to top head 14. Side-wall 16 includes a top flange 18. Top head 14 is attached to top flange 18. A cylindrically shaped core shroud 20 surrounds a reactor core 22. Shroud 20 is supported at one end by a shroud support 24 and includes a removable shroud head 26 at the other end. An annulus 28 is formed between shroud 20 and side-wall 16. A pump deck 30, which has a ring shape, extends between shroud support 24 and RPV side-wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, a diffuser 42, and a tailpipe assembly 43. Inlet riser 36 and two connected jet pumps 34 form a jet pump assembly 44.

Thermal power is generated within core 22, which includes fuel assemblies 46 of fissionable material. Water circulated up through core 22 is at least partially converted to steam. Steam separators 48 separates steam from water, which is recirculated. Residual water is removed from the steam by steam dryers 50. The steam exits RPV 10 through a steam outlet 52 near vessel top head 14.

The amount of thermal power generated in core 22 is regulated by inserting and withdrawing control rods 54 of neutron absorbing material, such as for example, boron carbide. To the extent that control rod 54 is inserted into core 22 between fuel assemblies 46, it absorbs neutrons that would otherwise be available to promote the chain reaction which generates thermal power in core 22. Control rod guide tubes 56 maintain the vertical motion of control rods 54 during insertion and withdrawal. Control rod drives 58 effect the insertion and withdrawal of control rods 54. Control rod drives 58 extend through bottom head 12.

Fuel assemblies 46 are aligned by a core plate 60 located at the base of core 22. A top guide 62 aligns fuel bundles 46 as they are lowered into core 22. Core plate 60 and top guide 62 are supported by core shroud 20. Pressure vessel 10 is mounted on a reinforced concrete pedestal 66

Figure 2:
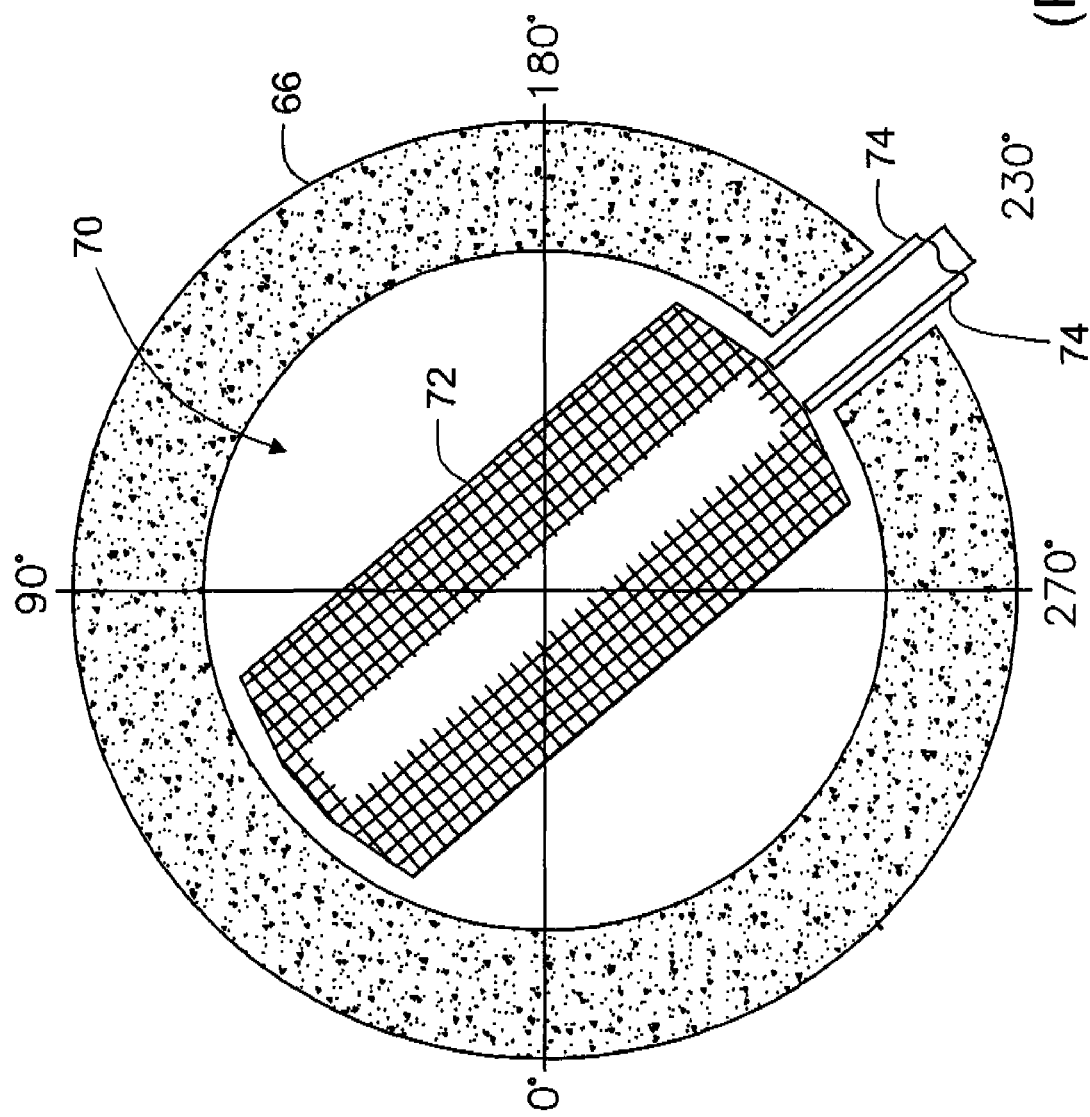
FIG. 2 is a sectional schematic illustration of the under pressure vessel area of the nuclear reactor shown in FIG. 1

FIG. 2 is a sectional schematic illustration of an under pressure vessel area 70 of nuclear reactor pressure vessel 10 enclosed by pedestal 66. Under pressure vessel area 70 includes a work platform 72 and transfer rails 74 that can be used for moving work equipment into under vessel area 70.

Referring to FIGS. 3-6, an instrument removal system 80 for removing detector cables 82 from nuclear reactor pressure vessel 10 includes, in an exemplary embodiment, a removal cart 84 and a disposal cask 86. Removal cart 84 includes a base 88 with a plurality of wheels 90 operatively coupled to base 88. Wheels 90 permit removal cart to move along transfer rails 74. A motor 92 mounted on base 88, and a drive shaft 94 is operatively coupled to motor 92. Motor 92 can be any suitable motor, for example, an electric motor, an hydraulic driven motor, and an air driven motor. A disposal spool 96 is removably mounted on drive shaft 94. Disposal spool 96 includes a notch 98 sized to receive an end of detector cable 82. Disposal spool 96 also includes a spiral groove 100 to facilitate coiling detector cable 82 around disposal spool 96.

Figure 3:
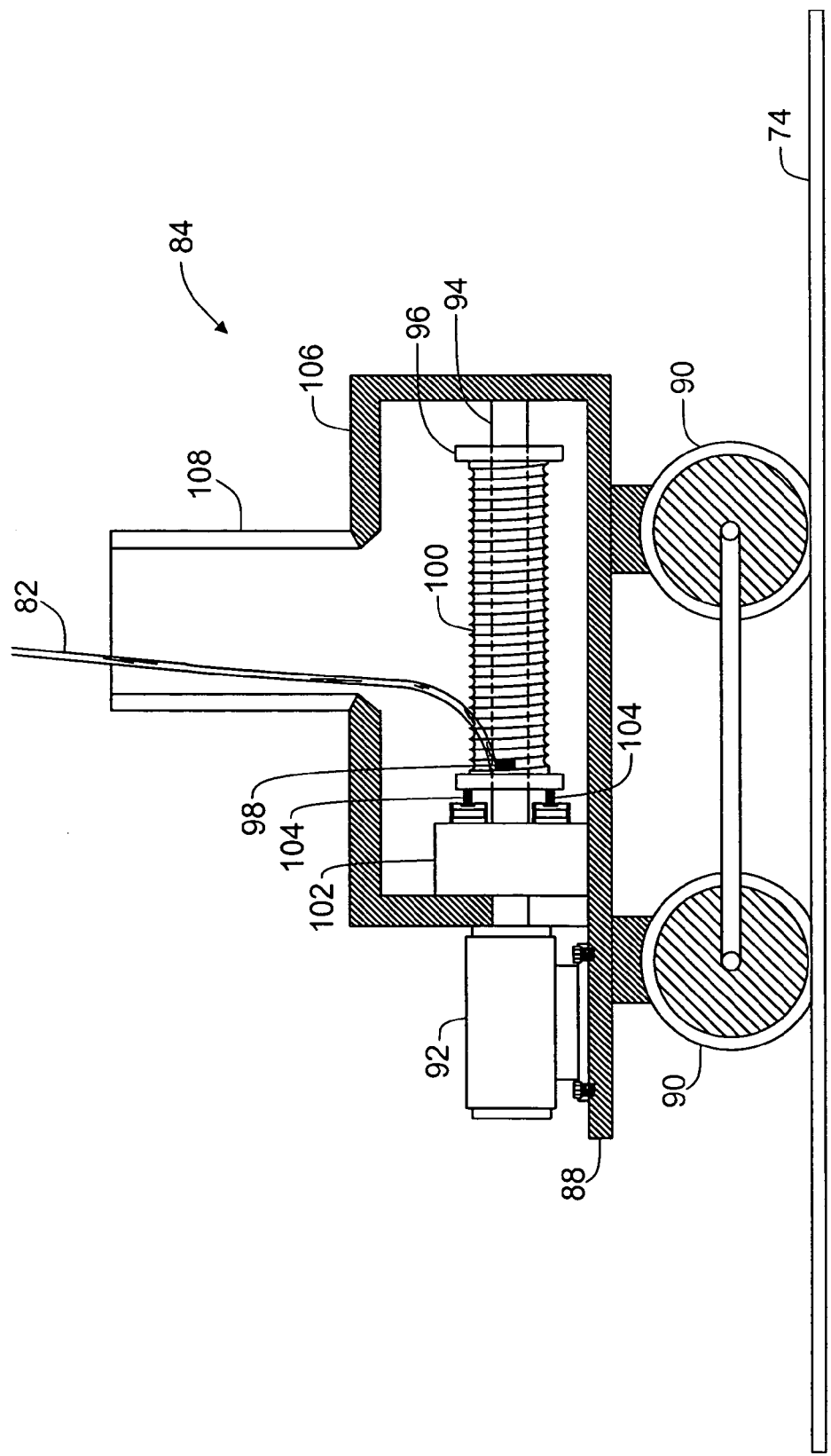
FIG. 3 is a side schematic illustration of an instrument removal system in accordance with an embodiment of the present invention.
Figure 4:
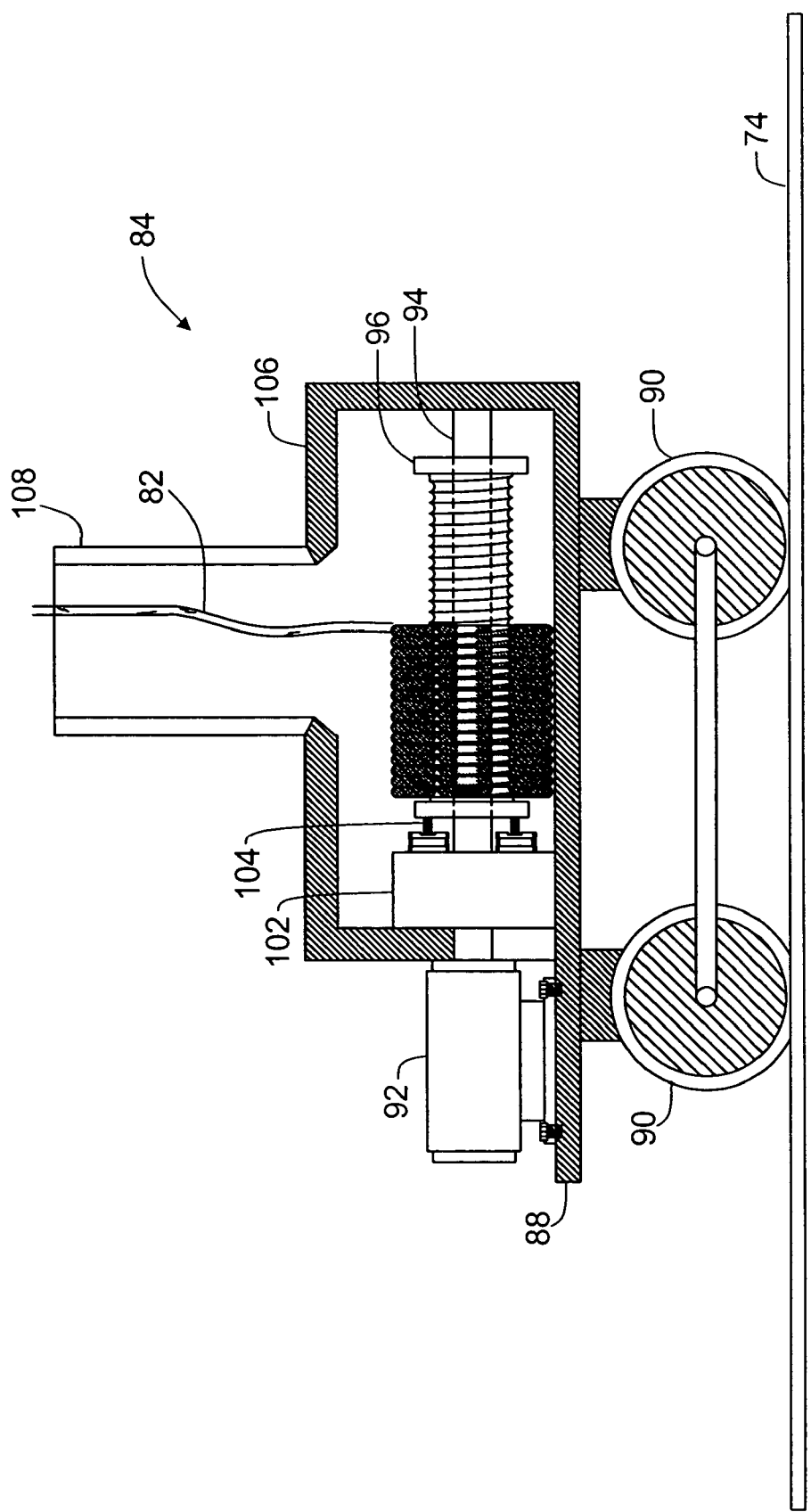
FIG. 4 is a side schematic illustration of the instrument removal system shown in FIG. 3 with a detector cable partially coiled around a disposal spool.
Figure 5:
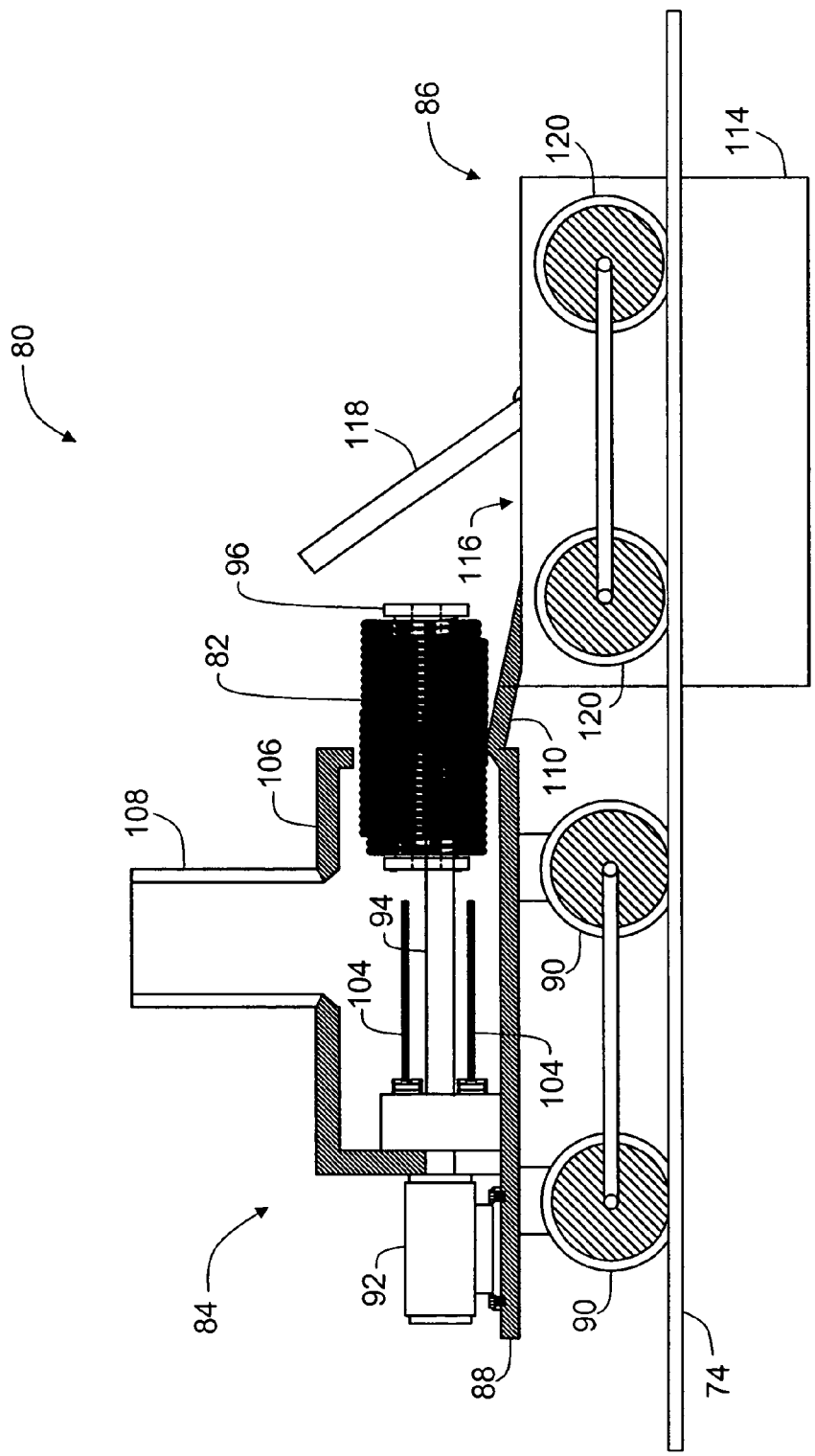
FIG. 5 is a side schematic illustration of the instrument removal system shown in FIG. 3 with the disposal spool being transferred to a disposal cask.
Figure 6:
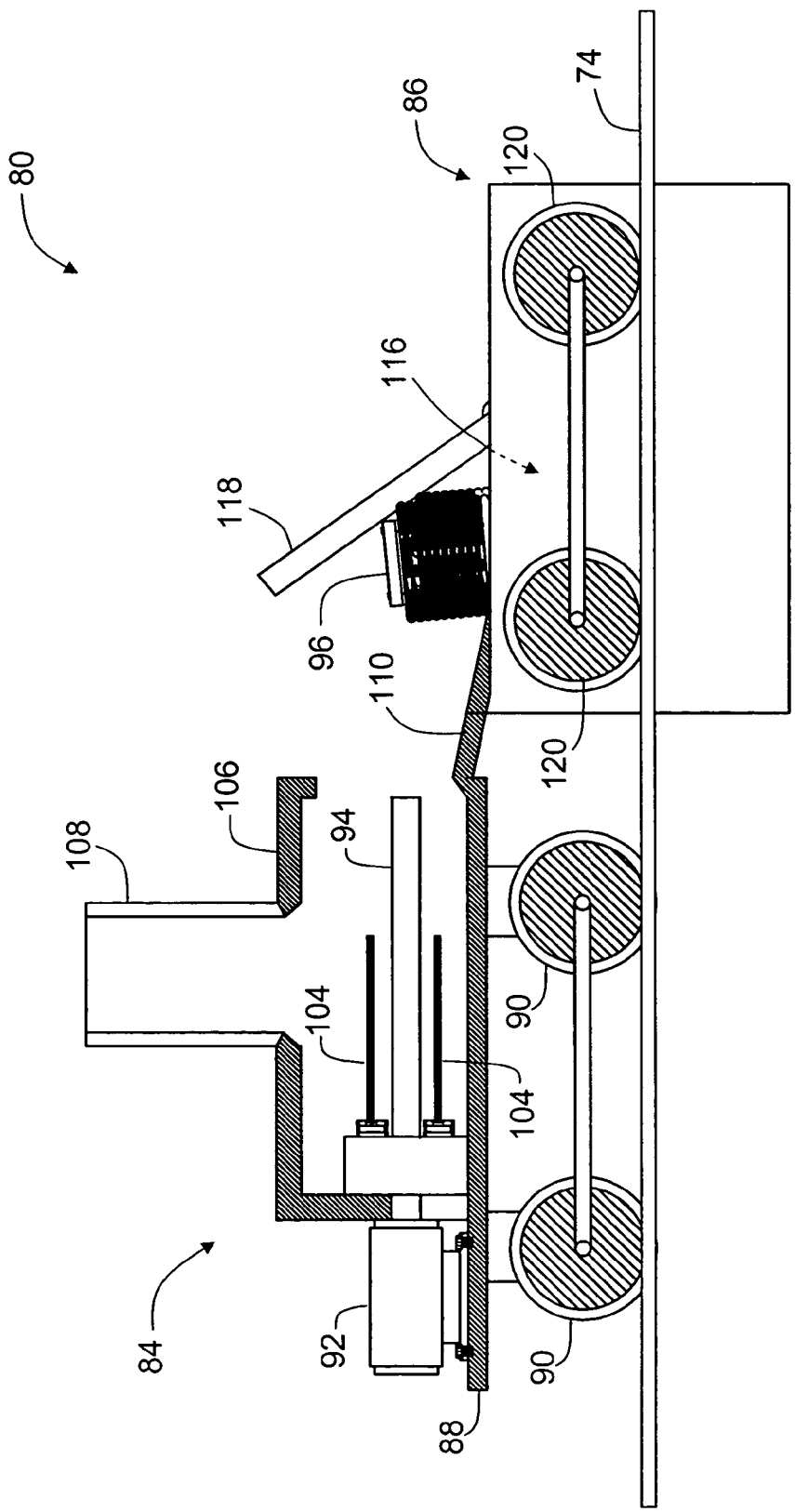
FIG. 6 is a side schematic illustration of the instrument removal system shown in FIG. 3 with the disposal spool transferred to the disposal cask.

A bearing block 102 is mounted on base 88 with drive shaft 94 extending through bearing block 102. At least one air piston 104 (two shown) is mounted in bearing block 102. FIGS. 3 and 4 show air pistons 104 in a first, non-extended position, and FIGS. 5 and 6 show air pistons 104 in an activated extended position. A housing 106 is mounted on base 88 with disposal spool 96, drive shaft 94, bearing block 102, and air pistons 104 positioned inside housing 106. An entrance port 108 is located in housing 106 to permit detector cable 82 to enter housing 106. In the exemplary embodiment entrance port 108 is formed from a transparent tube to permit remote visual monitoring during detector removal. A door 110 is located in one side of housing 106 that permits removal of disposal spool 96 from housing 106 when door 110 is in an open position (shown in FIGS. 5 and 6).

Disposal cask 86 includes a main body 114 having a receiving cavity 116 therein. Cavity 116 is sized to receive at least one disposal spool 96. An access door 118 permits access to cavity 116. When door 118 is in an open position, a disposal spool can be transferred into cavity 116. When door 118 is in a closed position, cavity 116 is sealed. A plurality of wheels 120 are operatively coupled to main body 114 to enable disposal cask 86 to move along rails 74 in under vessel area 70.

In operation, instrument removal system 80 is first positioned in under pressure vessel area 70. Particularly, removal cart 84 and disposal cask 86 are wheeled into under vessel area 70, and then an end of a detector cable 82 is inserted into notch 98 of disposal spool 96 in removal cart 84. Air motor 92 is activated to coil detector cable 82 onto disposal spool 96. After the entire length of detector cable 82 is coiled onto disposal spool 96, disposal spool 96 is transferred to disposal cask 86 by activating air pistons 104 to push disposal spool 96 off drive shaft 94, out door 106 and into disposal cask 86 through access door 118. Disposal cask 86 is then removed from under vessel area 70.

While the invention has been described in terms of various specific embodiments, those skilled in the art will recognize that the invention can be practiced with modification within the spirit and scope of the claims.

What is claimed is:

1. An instrument removal system for removing detector cables from a nuclear reactor, said instrument removal system comprising a removal cart and a disposal cask, said removal cart comprising:
    a base comprising a plurality of wheels coupled thereto;
    a motor mounted on said base;
    a drive shaft operatively coupled to said motor;
    a bearing block mounted on said base, said drive shaft extending from said motor through said bearing block;
    a disposal spool removably mounted on said drive shaft, said disposal spool comprising a notch sized to receive the detector cable;
    a housing mounted on said base, said housing enclosing said disposal spool and said bearing block; and
    an entrance port in said housing sized to permit the detector cable to enter said housing, said entrance port comprising a tube extending outwardly from said housing; and
    said disposal cask comprising:
    a main body having a cavity therein sized to receive at least one disposal spool;
    an access door in said main body that permits access to said cavity when said access door is in an open position; and
    a plurality of wheels operatively coupled to said main body.

2. An instrument removal system in accordance with claim 1 wherein said removal cart further comprises:
    at least one air driven piston mounted inside said housing; and
    a door in said housing sized to permit said at least one piston to push said disposal spool with detector cable wound thereon out of said housing when said door is in an open position.

3. An instrument removal system in accordance with claim 1 wherein said entrance port comprises a transparent tube.

4. An instrument removal system in accordance with claim 1 wherein said disposal spool comprises a spiral groove extending from a first end of said disposal spool to a second end of said disposal spool, said spiral groove sized to receive the detector cable.

5. An instrument removal system in accordance with claim 1 wherein said motor is an air driven motor.

6. A nuclear reactor comprising:
    a reactor pressure vessel;
    an under vessel platform positioned below said reactor pressure vessel;
    a plurality of transfer rails positioned below said reactor pressure vessel;

at least one detector cable;

an instrument removal system operationally positioned on said transfer rails below said reactor pressure vessel, said instrument removal system comprising a removal cart and a disposal cask, said removal cart comprising:

a base comprising a plurality of wheels coupled thereto;

a motor mounted on said base;

a drive shaft operatively coupled to said motor;

a bearing block mounted on said base, said drive shaft extending from said motor through said bearing block;

a disposal spool removably mounted on said drive shaft, said disposal spool comprising a notch sized to receive said detector cable;

a housing mounted on said base, said housing enclosing said disposal spool and said bearing block; and an entrance port in said housing sized to permit the detector cable to enter said housing, said entrance port comprising a tube extending outwardly from said housing; and said disposal cask comprising:

a main body having a cavity therein sized to receive at least one disposal spool;

an access door in said main body that permits access to said cavity when said access door is in an open position; and a plurality of wheels operatively coupled to said main body.

7. A nuclear reactor in accordance with claim 6 wherein said removal cart further comprises:

at least one air driven piston mounted inside said housing; and a door in said housing sized to permit said at least one piston to push said disposal spool, including the detector cable thereon, out of said housing when said door is in an open position.

8. A nuclear reactor in accordance with claim 6 wherein said entrance port comprises a transparent tube.

9. A nuclear reactor in accordance with claim 6 wherein said disposal spool comprises a spiral groove extending from a first end of said disposal spool to a second end of said disposal spool, said spiral groove sized to receive said detector cable.

10. A nuclear reactor in accordance with claim 6 wherein said motor is an air driven motor.

11. An instrument removal system in accordance with claim 1 wherein said disposal spool is concentrically mounted on said drive shaft.

12. An instrument removal system in accordance with claim 1 wherein said housing enclosed said disposal spool, said motor, and said drive shaft.

* * * * *